Aug. 10, 1926.
F. MAMIYA
1,595,557
FOLDING BICYCLE HANDLE
Filed March 9, 1926
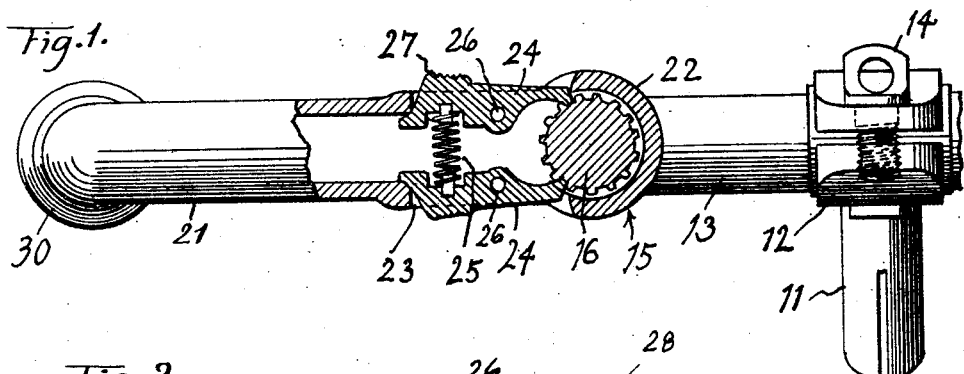
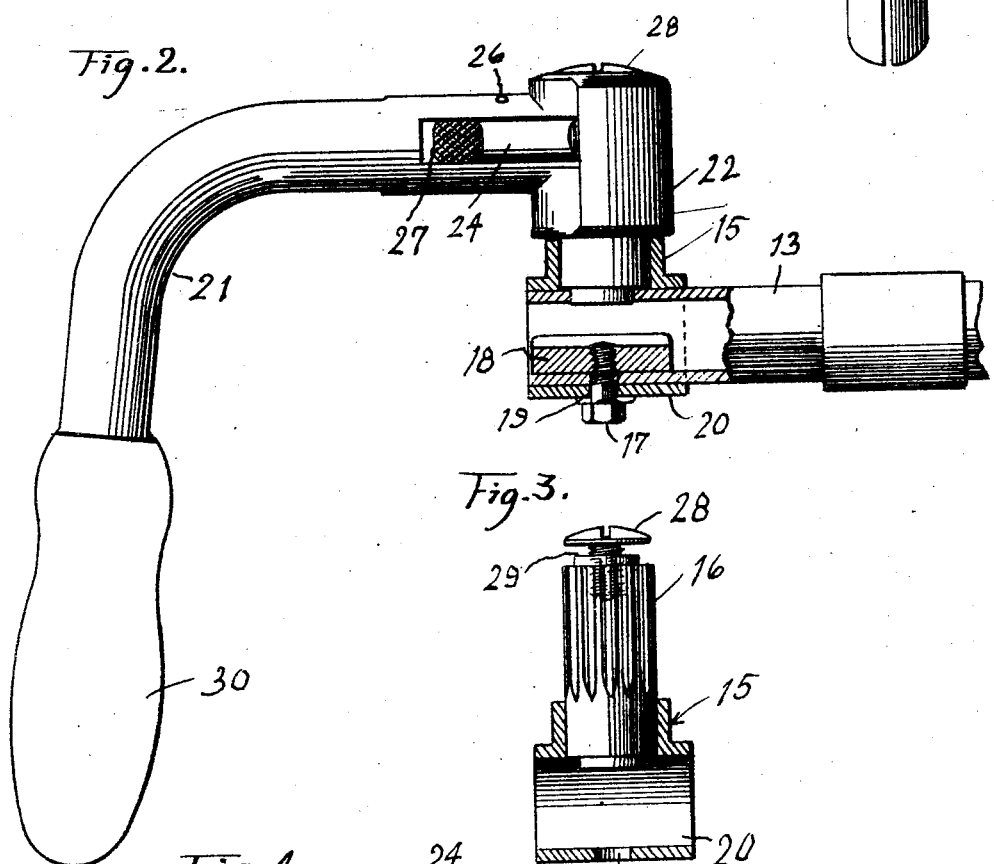
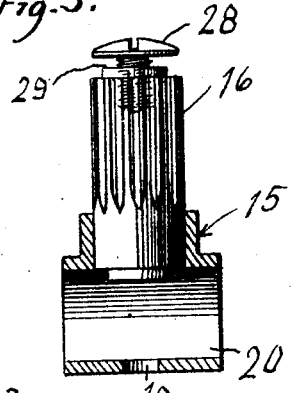
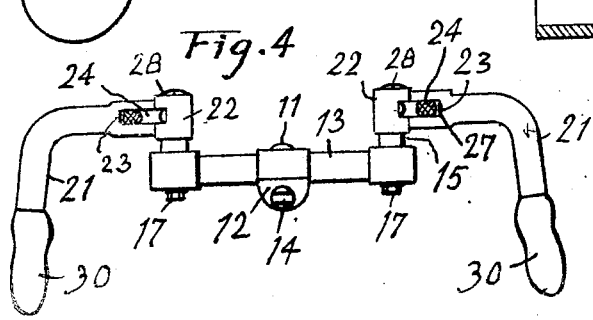
INVENTOR:
FUSAJIRO MAMIYA.
By Atty:
Edward M Kojima Patented Aug. 10, 1926.

1,595,557

UNITED STATES PATENT OFFICE.

FUSAJIRO MAMIYA, OF LOS ANGELES, CALIFORNIA.

FOLDING BICYCLE HANDLE.

Application filed March 9, 1926. Serial No. 93,446.

This invention relates to improvements in folding bicycle handles, and its objects are to provide handles which may be quickly adjusted to an operative position, which may be adjusted to any desired position, and which may be adjusted to a collapsed position for convenience in packing, for portability, or for parking the bicycle.

Another object is to provide means for adjustment whereby the bicycle rider may adjust the handles while riding on the bicycle, and may make the desired adjustment in two or three seconds of time.

Another object of this invention is to provide an improved and double locking means for each handle bar whereby the same is held perfectly rigid and firm in any of its adjusted positions.

To the accomplishment of the foregoing and other objects as may hereinafter be made to appear, the invention consists in the features hereinafter particularly described and then sought to be defined in the claims, reference being had to the accompanying drawings, in which:

Figure 1 is a fragmentary and sectional detail view of a handle bar for a bicycle, showing the locking and adjusting elements. Fig. 2 is a fragmentary and top plan view of a handle bar, parts being broken away to show details of construction. Fig. 3 is a sectional detail view of one of the handle adjusting elements, the gear member being shown in full lines. Fig. 4 is a plan view of the handle bars.

Referring in detail to the drawings, the central tubular portion 11, is adapted to be clamped in a bicycle frame, and has a clamp 12, integral therewith, and adapted to hold the transverse central bar 13 in any position of adjustment; the clamp having a screw member 14, serving to secure the clamp to bar 13.

Bar 13 is provided at each end, with angular extensions 15, each having a toothed extremity 16. The extensions 15, have the geared or toothed extremity 16, brazed thereto, and are secured to said central bar 13, by a screw member 17 in engagement with a clamp member 18, and passing through a hole 19, in the collar portion 20, of the member 15. Each adjustable member 21, is provided with an eye-end 22, adapted to encircle a gear-toothed member 16, and is provided with a slot 23, in which is mounted two opposed pawls 24, adapted to engage with said toothed member 16. The spring 25, interposed between opposed pawls, serves to actuate them and to maintain them in operative engagement with the toothed member 16, and thereby hold the handle bar in its adjusted postion. The pawls are mounted on pivot pins or shafts 26, and are released from their operative engagement with said members 16, by depressing the outer extremities 27, of the pawls. Each handle bar 21 is retained in position by a screw member 28, which is in engagement with a corresponding extremity 16. The screw member 28 is screwed against the shoulder 29, thereby allowing the eye-end 22, to turn freely when the holding pawls 24 are released. This arrangement allows the handles 30 to be quickly adjusted to any desired position.

From the foregoing description and drawings, it may be seen that I have provided simple and efficient means for adjustment of handle bars, whereby the handle bars may be adjusted to different positions for operative use, and whereby they may be adjusted to a relatively collapsed position to allow the bicycle to be stored, or for purposes of portability. The folding joint described is applicable for analogous purposes and in analogous ways.

What is claimed is:—

1. Foldable bicycle handles, comprising a central bar member, angular extensions fixed thereto, toothed extremities on the said angular extensions, movable handle bars including eye-ends adapted to revolve upon said toothed extremities, said handle bars each having a slot therein adjacent to the corresponding eye-end, pawls operatively mounted in said slots, and a spring element interposed between opposed pawls to hold them in operative engagement with a corresponding toothed extremity.

2. Foldable bicycle handles, comprising a central bar member, angular extensions fixed thereto, said angular extensions having each a toothed extremity, a movable handle bar including a handle, rotatively connected to each toothed extremity, a pair of opposed pawls arranged to hold each handle bar in a relatively fixed position upon a corresponding toothed extremity, said pawls engaging with said toothed extremity, and a screw member in engagement with each toothed extremity and serving to retain a handle bar in operative position on a corresponding toothed extremity.

3. Foldable bicycle handles, comprising a central bar member, angular extensions at each end thereof, a handle bar operatively mounted on each extension, retaining means to hold the handle bar in operative position, and opposed locking pawls carried by each handle bar and in engagement with a corresponding toothed extremity.

4. Foldable bicycle handles, comprising a central post adapted to be clamped to a bicycle frame, a clamp at the top of the post, a central bar adjustably mounted in said clamp, angularly disposed extensions one at each end of said central bar, a toothed extremity on each extension, a movable handle bar including an eye-end revoluble on each toothed extremity, said toothed extremity extending in said eye-end, a pair of opposed pawls operatively mounted on each handle bar, and engaging with a toothed extremity and on opposite sides thereof, and a spring element interposed between each pair of opposed pawls.

FUSAJIRO MAMIYA.